F. J. LUDINGTON.
MACHINE FOR MAKING AND TIPPING CIGARETTES.
APPLICATION FILED SEPT. 29, 1905.

989,787.

Patented Apr. 18, 1911.
9 SHEETS—SHEET 3.

Attest:
L. Lee.
Arthur F. Heaton.

Inventor.
Frank J. Ludington,
per Thomas S. Crane, Atty.

F. J. LUDINGTON.
MACHINE FOR MAKING AND TIPPING CIGARETTES.
APPLICATION FILED SEPT. 29, 1905.
989,787.
Patented Apr. 18, 1911.
9 SHEETS—SHEET 4.
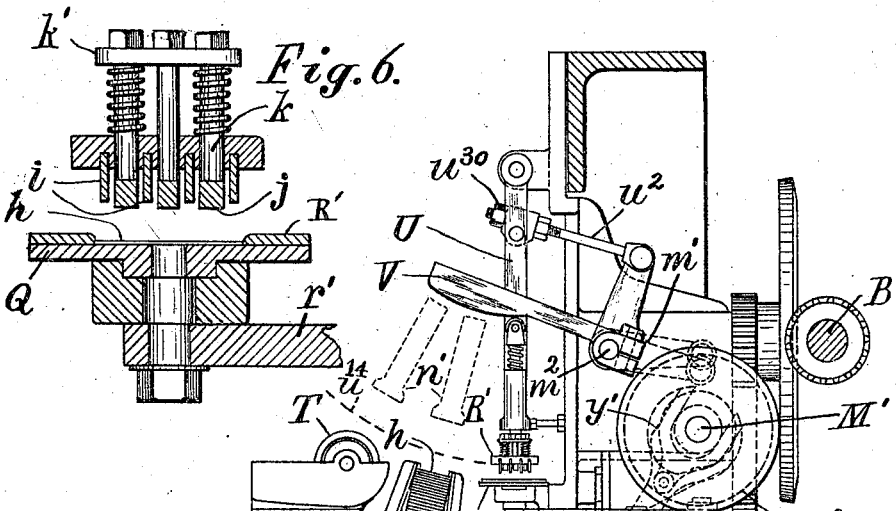
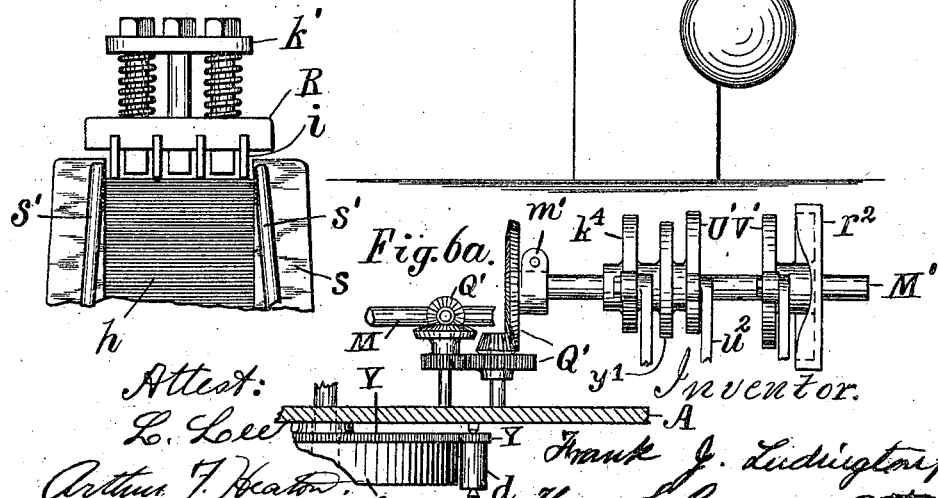
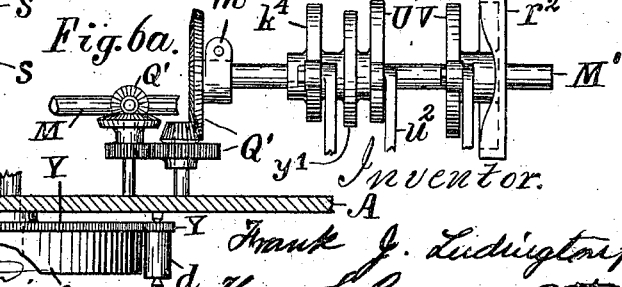

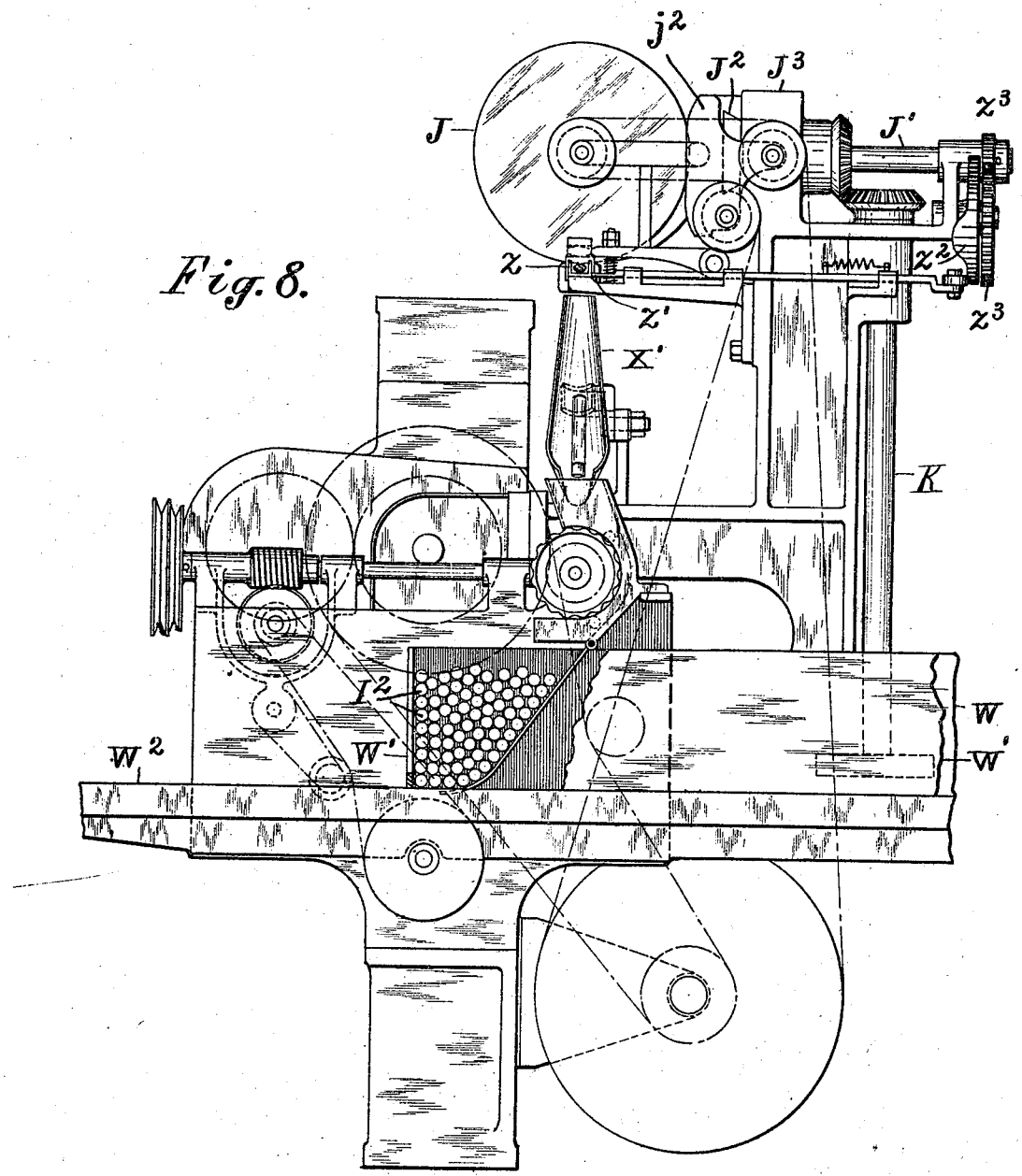

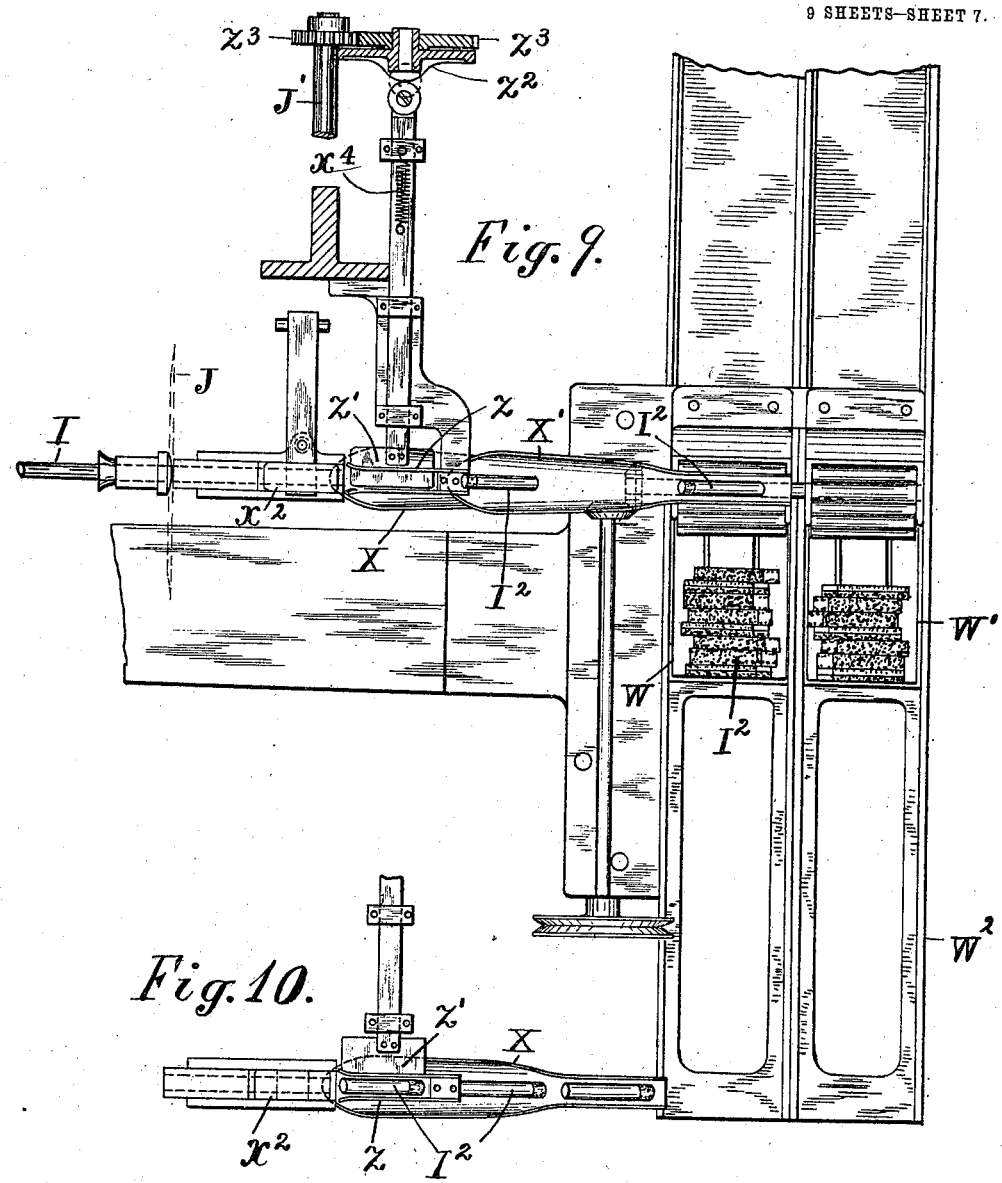

F. J. LUDINGTON.
MACHINE FOR MAKING AND TIPPING CIGARETTES.
APPLICATION FILED SEPT. 29, 1905.
989,787.
Patented Apr. 18, 1911.
9 SHEETS—SHEET 8.
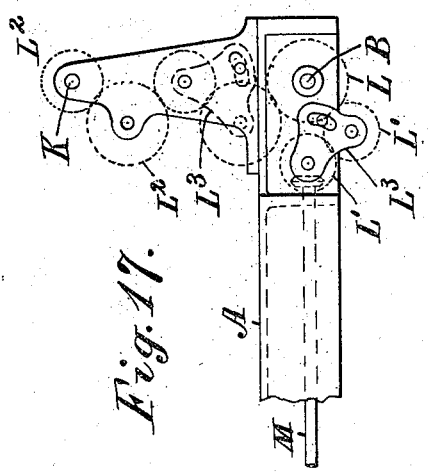
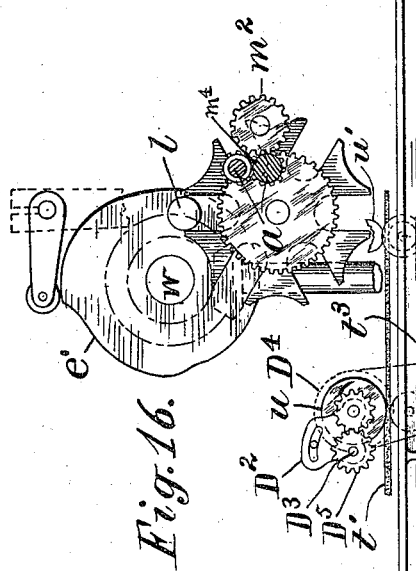
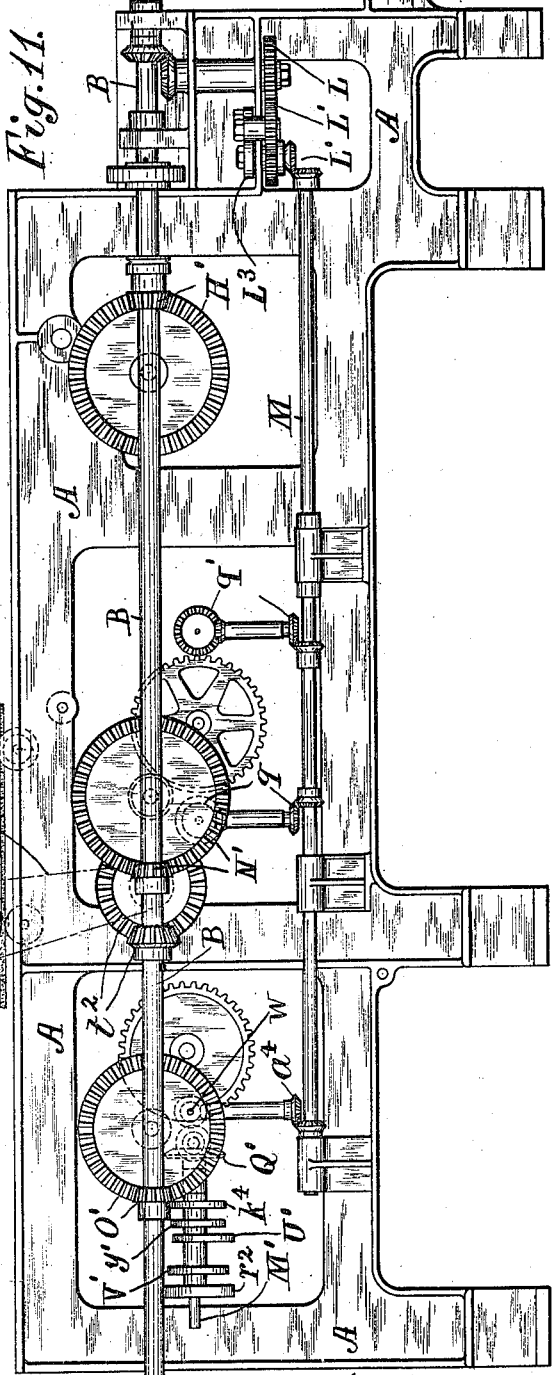

UNITED STATES PATENT OFFICE.

FRANK J. LUDINGTON, OF WATERBURY, CONNECTICUT.

MACHINE FOR MAKING AND TIPPING CIGARETTES.

989,787.

Specification of Letters Patent. Patented Apr. 18, 1911.

Application filed September 29, 1905. Serial No. 280,715.

*To all whom it may concern:*

Be it known that I, FRANK J. LUDINGTON, a citizen of the United States, of No. 63 Bank street, Waterbury, county of New Haven, and State of Connecticut, have invented certain new and useful Improvements in Machines for Making and Tipping Cigarettes, fully described and represented in the following specification and the accompanying drawings, forming a part of the same.

The object of the present invention is to furnish an improved means for applying patches of tipping material at suitable intervals to the paper wrapper in a cigarette machine before the wrapper is folded in making the cigarette rod, and the operation is effected in the same machine in which the cigarette-rod is formed and cut into cigarettes, so that the devices for printing inscriptions upon the cigarettes, for applying the patches, and for cutting the rod into cigarettes, may be operated in unison, and the cigarette tips thus be disposed upon the wrapper at the point where the cutter operates to separate the cigarettes. In the present invention the tipping patches are preferably formed from separate sections of tipping material, about ten inches in length, which are adapted each to form a definite number as ten, of the patches, and the invention includes means for transferring the sections successively to a carriage, for depositing lines of gum upon the sections, and for severing them into patches and delivering the patches at suitable intervals to the wrapper and pressing them thereon. Where the patches are made of suitable width to form two tips, they are divided in the middle by the cutter which severs the cigarette-rod, which also severs the rod intermediate to such patches, and the alternate successive cigarettes as they are delivered from the cutter, are thus provided with their tips at the rear and forward ends respectively.

Figure 1:
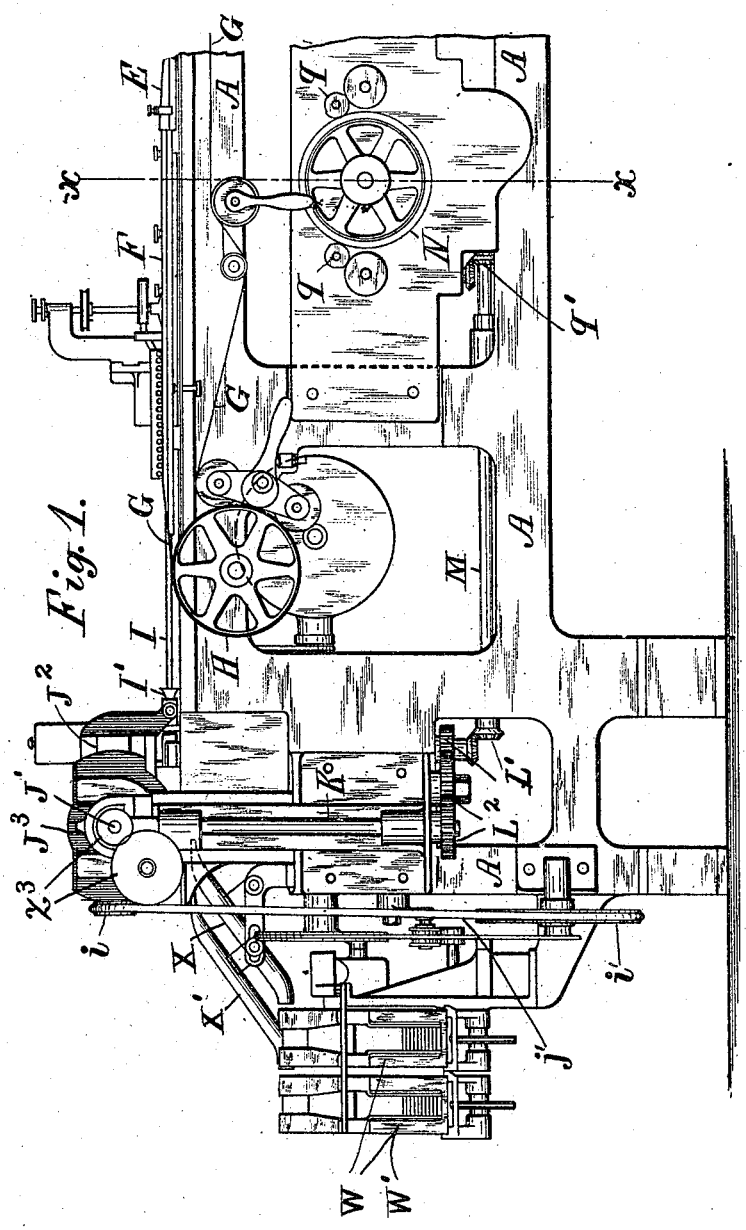
Figure 2:
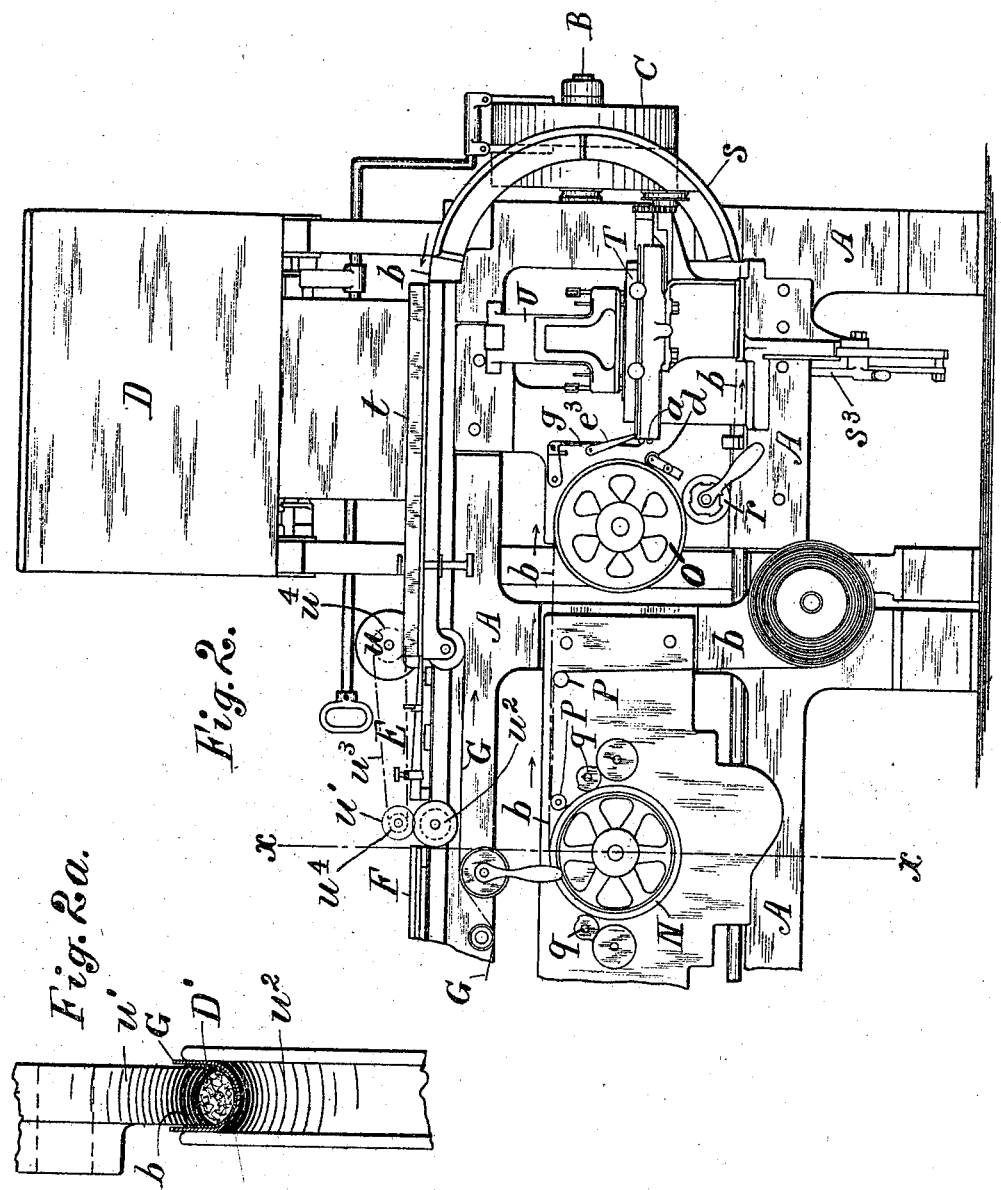
Figure 3:
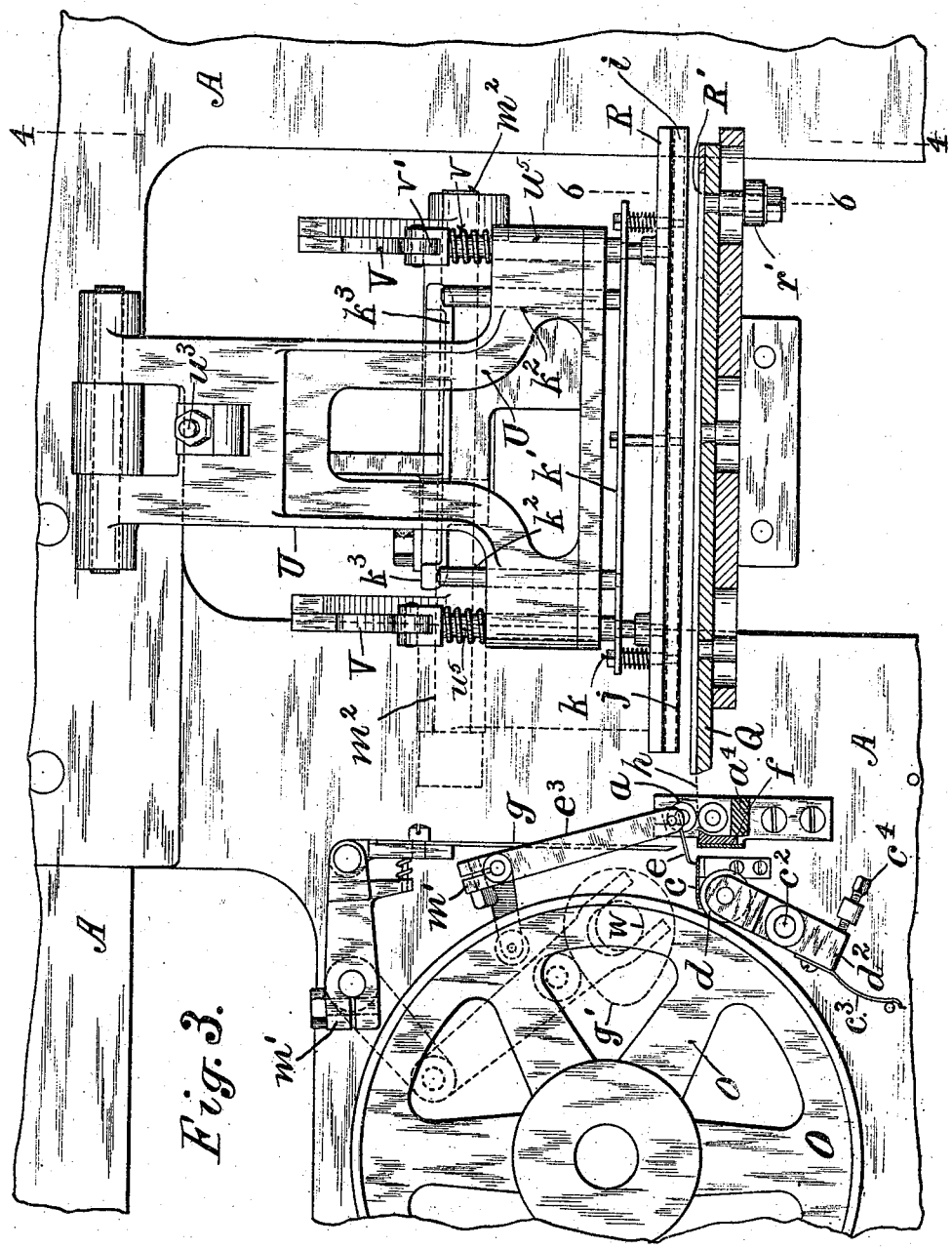
Figure 7:
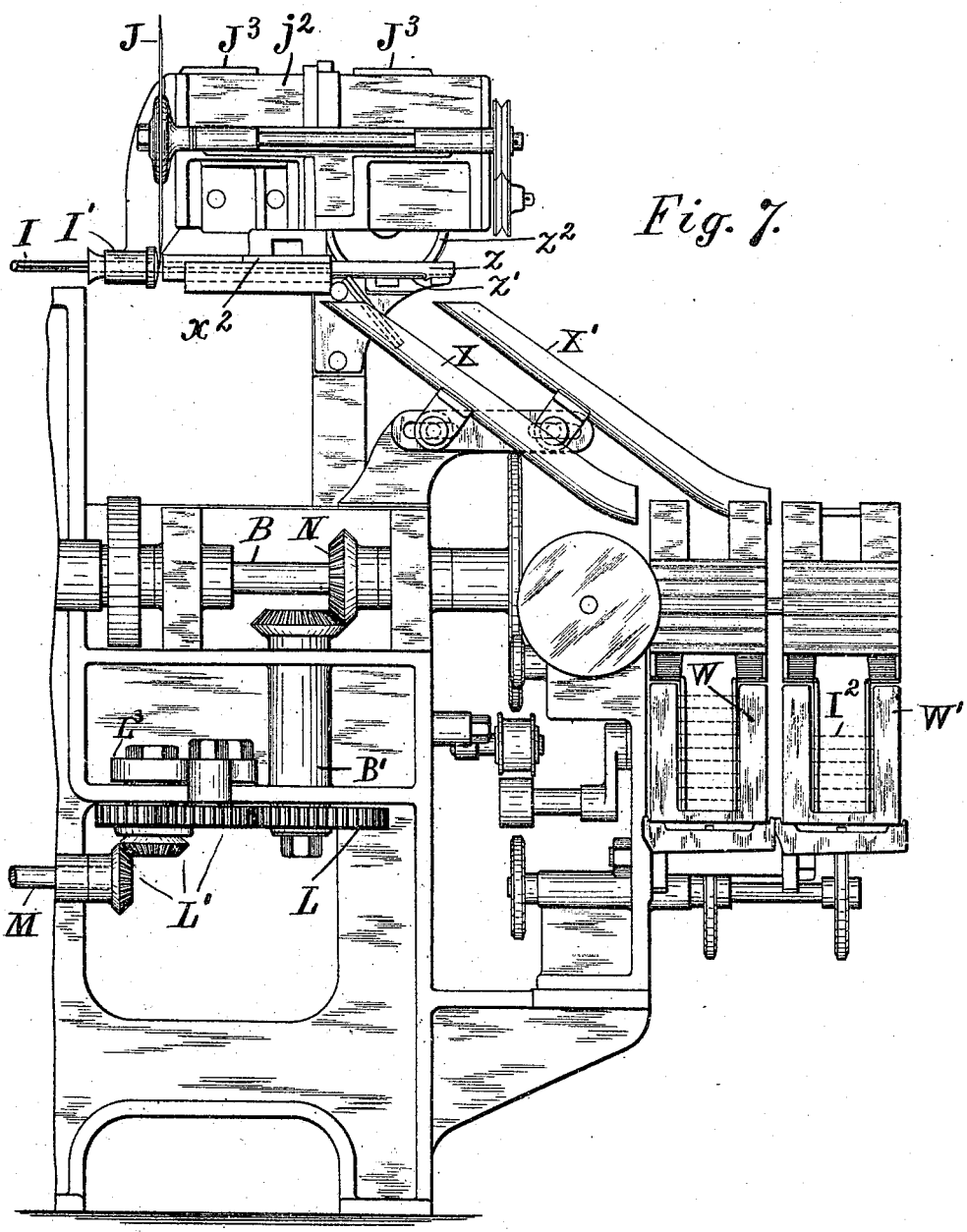
Figure 12:
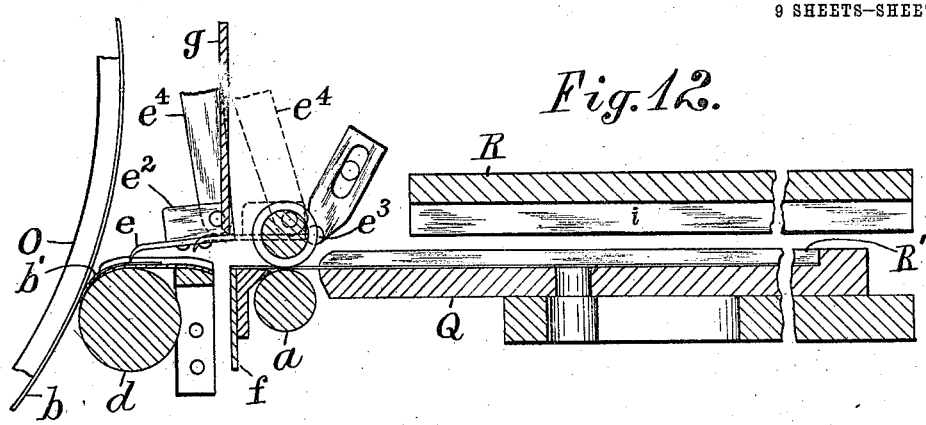
Figure 13:
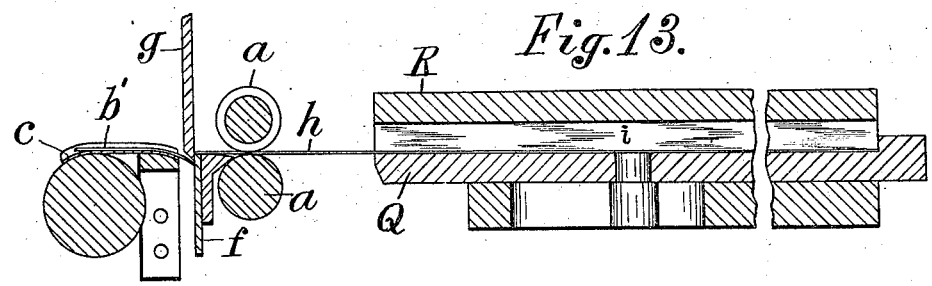
Figure 14:
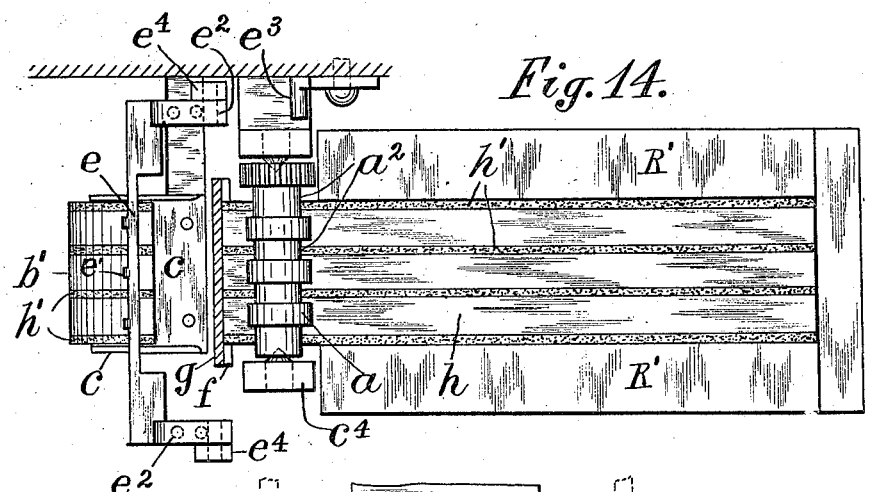
Figure 15:
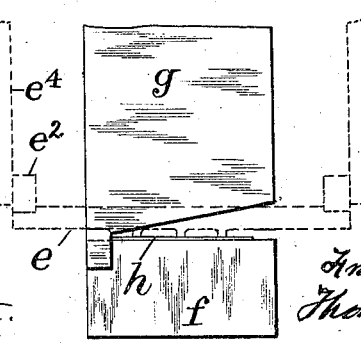

A slowly moving receptacle termed a "stacker" is employed to receive the finished cigarettes, and if they were successively delivered in the same stacker the tips or mouth-pieces would not lie at the same ends of the cigarettes, but alternately at the opposite ends. To avoid such a stacking of the cigarettes and the necessity of handling one half of the cigarettes to turn the tips all in the same direction, I furnish two stackers W, W', movable side by side transverse to the path of the cigarette-rod, and two chutes X, X', leading from the two stackers to a trough $z$ which receives the cut cigarettes. The trough is formed with a movable bottom which when opened permits the cigarettes to pass to the nearest trough, and when closed delivers them to the farther trough and stacker. The bottom of the trough is moved by a cam in unison with the movements of the cigarette-cutter, so that the alternate cigarettes are delivered respectively into the two stackers and all of the cigarettes in each stacker are laid with the tips or mouth-pieces at one end. They can thus be removed directly from the stackers and placed in packages without any further handling. The means for performing these operations may be considerably varied, being shown in one form in the annexed drawing, in which a front view of a cigarette machine provided with the improvements is represented upon two sheets in Figures 1 and 2 respectively, the junction line of the two figures being indicated by the dotted line $x$, $x$, upon each figure. Fig. 2ª shows the filler-forming rolls. Fig. 3 is a front view upon an enlarged scale of the devices for feeding the sections of tipping material to the wrapper, with the pasting device removed and the carriage for the tipping material shown in section at the center line. Fig. 3 show various details of construction, as the parts $c$, $e$ and $c^3$ which could not be shown in Fig. 2, on account of the reduced scale of that figure. Fig. 4 is a cross section of the machine on line 4, 4, in Fig. 3, with the magazine shown in section near one end, and dotted lines $u^{14}$ showing different positions of the carrier for the tipping-material sections. Fig. 5 is an enlarged section of the top of the magazine (as it is shown in Fig. 4) with the section carrier partly pressed upon the tipping sections. Fig. 6 is a cross section on line 6, 6, in Fig. 3, of the carriage with one of the sections thereon, and the carrier lifted from the same. Fig. 6ª is a fragmentary detail. Fig. 7 is a rear elevation of the end of the machine where the cigarettes are cut off and delivered to the stackers; Fig. 8 is an end view of the frame with the stackers and cutting-off mechanism; Fig. 9 is a plan of the stackers and part of the cutting-off mechanism; Fig. 10 is a plan of the cigarette receiving trough with the bottom opened; and Fig. 11 shows the rear side of the cigarette machine frame with the gearing illustrated diagrammatically for connecting the cutter, the printing mechanism, and the mechanism for cutting up the tipping material and applying it to the wrapper. Fig. 12 is a transverse section of the patch feeding appliances with a patch severed from the "material-section" and pushed into the bite of the feeding-drum and pressing-roll. Fig. 13 is a similar section with a patch severed from the "material-section." Fig. 14 is a plan of the parts shown in Fig. 12; Fig. 15 is an elevation of the patch-cutter and tucker viewed from the left side of Fig. 12; and Fig. 16 is a diagram of the rolls $a$, the shaft $w$, and the gearing which connect the same. Fig. 17 is a plan of the standard which carries the cigarette-cutter with the gearing in diagrammatic form, connecting the cutter with the main shaft and with the unison-shaft. Figs. 1, 2, 11 and 17 are drawn on a smaller scale than the other figures.

The machine illustrated in the drawing is of the same general type as that shown in my prior Patent No. 763,991 granted July 5, 1904 for continuous cigarette machine.

A designates the frame of the cigarette machine, and B the main driving shaft with driving pulleys C.

The tobacco feeder is shown at D, the appliances for shaping the wrapper, and forming the cigarette-rod and pasting the wrapper are shown at E and F. A tape G is shown driven by a tape-wheel H and extended, over guide-pulleys, through the forming and pasting appliances, and delivering the cigarette-rod I to the guide I′ of the cigarette-cutter.

The cutter J is actuated by a vertical shaft K which is connected by gears $L^2$, change-wheel L, and shaft B′ with the driving-shaft B. As the shaft B is connected directly with the tape-wheel H which determines the speed of the wrapper and cigarette-rod, such change-wheel, by the usual mechanism connected with the cutter, serves to vary the length of the cigarette in the desired manner. These parts are already well known in their operation by my former patents. The shaft B is connected by gearing H′ with the tape-wheel H, by gearing N′ with the printing drum N, and by gearing O′ with the wrapper-feeding-drum O.

A unison-shaft M is extended below the shaft B and is connected by gearing $a^4$ and shaft $w$ with the material-feeding-rolls $a$, and by gearing Q′ with a cam-shaft M′, to operate the carriage Q which supplies the sections of tipping-material to the said rolls. The shaft M′ carries cams $r^2$, V′, U′, $y'$ and $k^4$, which control the movements of the carrier R to pick up successively the sections of tipping-material, deposit them upon a carriage which delivers them to the feeding-rolls $a$. This unison-shaft is driven by the same change-wheel L which drives the shaft K connected with the cigarette-cutter-head $j^2$, and the impressions which are printed upon the wrapper, and the intervals at which the tipping-patches are applied to the wrapper, are thus varied in agreement with the variations in the length of the cigarettes. The wrapper $b$ is guided from a reel $b^4$ to the printer by rolls P, (see Fig. 2), and after traveling around the printing drum and receiving impressions from the printing rolls $q$, passes around one side of the feeding-drum O under the pressing-roll $d$, and thence over a guide-roll $r$ and through a semi-circular paper guide $s$ to the trough $t$, where the tobacco is deposited upon the wrapper. At the rear end of the trough, where the tobacco is compressed by rolls $u$, the wrapper passes upon the tape G and travels therewith in its movement through the former E and seaming dies F. A patch-guide $c$ is supported over the pressing-roll $d$ and a tucking-finger or tucker $e$ is arranged to move over the same to and from the surface of the feeding-drum O.

Feed-rolls $a$ are shown (Figs. 3, 12 and 13) adjacent to the patch-guide, and stationary and movable cutter-blades $f$ and $g$ are arranged between the rolls and the patch-guide and operated to sever the tipping-patches from the section $h$ of tipping material. The housing $a^4$ of the rolls $a$ is shown in section in Fig. 3.

A carriage Q is arranged in a suitable position to deliver the sections $h$ successively to the feed-rolls, the carriage being movable longitudinally away from the rolls to receive the section and then advanced sufficiently to place the end of the section in the bite of the rolls, after which the rolls draw the remainder of the sections forward until it is all cut into patches. A carrier R is arranged to pick up the sections of tipping material, to deposit strips of paste thereon, and to place them upon the carriage.

The pressing-roll $g$ is shown in Fig. 3 mounted upon a swing-frame $d^2$ journaled upon the pivot $c^2$, and pressed normally toward the drum, as by a spring $c^3$. A stop-screw $c^4$ is provided to set the spring-frame $d^2$ so that the pressing-roll $d$ may not crowd against the drum O, but merely press the gummed patches into contact with the wrapper.

The carriage Q and carrier R are operated in conjunction with a magazine $s$, which stands at one side of the carriage and contains the "sections" $h$ of tipping material, and the carrier R is mounted upon a pivoted arm U by which it may be moved into line with either the carriage or the magazine. The magazine is shown of rectangular shape and of long narrow form adapted to fit snugly the long narrow tipping sections which are employed to form ten of the patches. Fig. 5 shows the width of one of the sections the same as Fig. 14. The carrier R is movable upon the pivoted arm by means of studs $u^5$ which have springs $v$ to draw the carriage normally upward, and rolls $v'$ upon their upper ends, upon which a shifter-arm V is operated to press the carrier toward the contents of the magazine or toward the carriage when in line therewith. The face-plate of the carrier is provided, as shown in Figs. 4, 5 and 6, with a series of longitudinal gum-seats $i$, and a paste-roll T (supplied with a film of paste) is mounted at the outer side of the magazine $s$, and the pivoted arm U is actuated to move the gum-seats over the paste-roll for a charge of paste before pressing the carrier toward the "sections" in the magazine. In Fig. 4, the carrier is shown in full lines over the carriage, and dotted lines $n'$ indicate the position of the pivoted arm when the carrier is moved over the paste-roll and magazine; while a curve $u^{14}$ shows the path of the carrier during such shifting movement. A cam-shaft M' is shown in Fig. 4 adjacent to the carrier, and connected with the unison-shaft M by gears Q' which give it a reduced speed in the same proportion that the strokes of the cigarette-cutter J bear to the number of patches in the section of the tipping material. In Fig. 3 of the drawing, the section of tipping material $h$ is represented of suitable length to make just ten tipping patches, and the cam-shaft therefore requires to be revolved but once, to actuate the carrier and supply a single section of tipping material to the carriage once during twenty strokes of the cutter. This is due to the fact that each of the ten tipping patches furnishes a mouth-piece for two cigarettes, so that the cutter must operate to sever twenty cigarettes from the cigarette-rod, while the cam-shaft is supplying a single section of tipping material to the carriage. A cam U' is shown upon the cam-shaft M' in Fig. $6^a$ and Fig. 11, and is connected, as shown in Fig. 4, by an arm and link $u^2$ with the pivoted arm and has projections upon it adapted to shift the carrier R intermittingly to the paste-roll and the magazine $s$, and back to the carriage Q; the carrier dwelling over the magazine and carriage, while the carrier is pressed toward the same. The movement of the carrier to and from the magazine and carriage is effected by the shifter-arm V, which is actuated intermittingly at the proper time to press the carrier downward upon the studs $u^5$ when the carrier is over the magazine and carriage. The shifter-arm is thus actuated by its connection to a rock-shaft $m^a$ having a lever-arm extended over a cam V' upon the shaft M' shown in Figs. $6^a$ and 11. Such cam is shaped to press the carrier toward the sections $h$ in the magazine, after the seats have been in contact with the paste-roll T. The cam then moves the shifter-arm and allows the springs $v$ to lift the carrier with such section of tipping material from the magazine, and the section is then moved over the carriage by the oscillating movement of the carrier, and when over the carriage the shifter arm presses such section down upon the carriage between the flanges R' thereon. The carriage at such time is held at its greatest distance from the feed-roll $a$, so as to place the tipping section in readiness for its forward feeding movement. The carriage is thus held, as shown in Fig. 1, during the placing of the tipping section thereon, by a lever $r$ shown in Fig. 4 and a cam $r^2$ (shown in Fig. 11) upon the shaft M'. When the gum-seats have deposited the section upon the carriage, the section is stripped from the seats by the strippers $j$ which are connected by a plate $k'$ with studs $k^2$ movable in the pivoted arm U, and a lever $k^3$ is provided to press upon the studs and actuated by a cam $k^4$ upon the cam-shaft M', to press the strippers downward, as shown in Fig. 6, and thus force the section from the seats and leave it lying upon the carriage, when the carrier is again elevated, as shown in Fig. 6. The end of the section is disposed overlapping the end of the carriage to facilitate its introduction between the upper and lower feed-rolls $a$, when the carriage is moved toward the same, which movement is effected by a suitable projection upon the cam $k^4$ and occurs after the cutting of each twentieth cigarette from the cigarette-rod. The section $h$ is moved by the carriage to the bite of the feed-rolls, which are immediately rotated through an arc sufficient to deliver one tipping-patch beyond the lower patch-cutter $f$, and when the feed-rolls come to rest the upper cutter $g$ is forced downward, leaving the patch held upon the patch-guide $c$ by the tucker $e$. The tucker $e$ is raised during such advance before the severing of the patch, by a stop or lifter $e^3$ shown in Figs. 12 and 14, and is then brought into contact with the upper side of the patch and pushes the same forward into the bite of the pressing-roll $d$ and drum O, as shown in Fig. 12.

Grooves $a^2$ are formed in the upper feed-roll to clear the lines $h'$ of paste which is deposited upon the section of material by the gum-seats $i$, as shown in Fig. 14 and the tucker is notched out, leaving teeth $e'$ which press upon the patch $b'$ only between the lines of paste.

The feeding-rolls and tucker are actuated by a shaft $w$ (see Fig. 3) which is connected with the unison-shaft M by the gearing $a^4$, (see Fig. 16), and has a cam $g'$ which actuates the patch-cutter $g$ (see Fig. 3), and a cam $e'$ which actuates the tucker $e$ (see Fig. 16). The shaft $w$, as shown in Fig. 16, carries the crank-pin $l$ which engages a star-wheel $m$ connected by gears $m^4$ and $m^2$ with the lower roll $a$, the operation of the star-wheel turning the rolls intermittingly through the desired arc, sufficient to feed forward one patch. The pressing-roll $d$ is also driven positively at the same surface speed as the wrapper-feeding drum O, so as to secure a positive movement of the wrapper and thus secure the cutting of the cigarettes precisely in the middle of such of the tips formed by the tipping-patches. This is effected by intermeshing gears Y upon the wrapper-feeding drum O and the pressing-roll $d$, as shown in Fig. 6$^A$.

The magazine is provided with a plunger $s^2$ pressed normally upward by a weighted lever $s^3$ during the removal of one of the sections $h$; but intermediate to the removal of the sections the plunger is locked by a stud $y$, which is pressed against the plunger-rod by a short-armed lever $Y^2$ connected with a rod $y^2$ which is actuated by a cam $y'$, shown in Figs. 4 and 6$^a$. The pressure of the stud $y$ is released only while the gum-seats are pressed upon the upper section $h$ in the magazine, so that the plunger feeds the sections gradually up to the same level. Inclined spring fingers $s'$ are extended through slots in the sides of the magazine near the top and press lightly upon the edges of the sections $h$ and hold the remainder from displacement as each section is removed. The fingers have springs shown in Fig. 4 near their pivots $t'$ and several are applied to each of the opposite long sides of the magazine. Fig. 4 shows the slots extended downwardly in the upper edge of the magazine for a sufficient distance to admit the upper ends of the fingers $s'$; which are inclined toward one another and serrated upon their inner sides as shown in Fig. 5, to exercise an abrading or scraping action upon the edges of the sections $h$ during the lifting movement of the upper section. In practice, the spring fingers rest upon the bottoms of the slots as shown in Fig. 4, so that their upper inclined ends are held close to the sections in the magazine, and when the upper section is lifted by adhesion to the gum-seats $i$, the spring fingers rub upon the edges of such section and detach any of the following sections which may adhere temporarily thereto. All the tipping-devices are operated from the unison-shaft, and to make their operation correspond exactly with the operation of the cutter, a single change-wheel L is fitted detachably to a shaft B' driven by the main shaft B, as shown in Figs. 7 and 11, and this change-wheel, as shown in Fig. 17, is connected by two trains of gearing L' and L$^2$ respectively, with the unison-shaft M and cutter-shaft K. Each of these trains of gearing includes an adjustable wheel mounted upon a pivoted frog L$^3$, so that when the change-wheel L is varied in size, the intermediate wheel carried by the frog may be fitted in to mesh with such change-wheel. One of the gears L$^2$ is shown in Fig. 8, and two of them in Fig. 1, while a part of the gears L' are shown in Figs. 1 and 11.

The cutter is shown mounted upon a carriage $j^2$ fitted to a dovetail J$^2$ upon the stand J$^3$, in which the shaft J' is journaled to shift the carriage longitudinally during the cutting of each cigarette, as is customary in continuous machines, in correspondence with the movement of the cigarette-rod. The cutter is driven by pulleys $i'$ and cord $j'$ (see Fig. 1). These parts are of common construction and operate as described in my former patent; and Figs. 9 and 10 also show dies $x^2$ for creasing the edges of the cigarettes just before they are delivered from the machine.

A trough $z$ with a movable bottom $z'$ is shown in Figs. 8, 9 and 10 supported just beyond the creasing dies, to receive the cigarette which is delivered therefrom, as the carriage moves backwardly after each stroke of the cutter J, and two chutes X and X' are arranged respectively below the trough and beyond its outer end and disposed to deliver the cigarettes I$^2$ into two stackers W and W', which are shown of ordinary construction and arranged to move upon tracks W$^2$ at right angles to the path of the cigarette-rod I. The bottom $z'$ of the trough is shown as a flat plate actuated by a cam $z^2$ (see Fig. 9) and spring $x^4$. The stackers W and W', as well as their supporting rails W$^2$, shown in Figs. 8 and 9, are each of the construction common for such structures, and the operation of the corrugated drums W$^3$ which receive the cigarettes from the chutes X and X' and of the sloping plate W$^4$ below the same which delivers them into the stackers, is already well understood and needs no description herein. The cam is connected by gears $z^3$ with the shaft J' which determines the movement of the cutter-carriage $j^2$. The gears $z^3$ are shown as toothed wheels in Figs. 8 and 9; but in Fig. 1 are merely indicated by circles, as the scale of Fig. 1 is too small to represent the teeth. These gears are proportioned to withdraw the bottom from the trough at each alternate stroke of the cutter, so that the alternate cigarettes are delivered respectively into the troughs X and X'. Figs. 7, 8 and 10 show the bottom retracted and the cigarettes falling into the chute X which delivers them to the stacker W, while Fig. 9 shows the trough-bottom closed and cigarettes falling into the chute X' which delivers them to the stacker W'. The mouth-pieces all lie in the same direction on the cigarettes in each stack.

It will be readily understood that very fine workmanship is required, and exact proportions for the drums which operate the tape and the wrapper, to secure the printing of the wrapper, the application of the tipping-patches thereto, and the delivery of the same to the tape at precisely the required speed, so that the tape may always exercise a slight pull upon the wrapper, where the latter is delivered thereto, and so that the cigarette-rod may reach the cigarette-cutter J with the middle of each tipping-patch directly under the edge of the cutter when the cigarette-rod is severed. As the required adjustment of all the parts cannot be readily made in the primary construction of the machine, I have provided slip-joints $m'$ in many of the connections, which permit such connections to be adjusted in relation to the other connections, and thus secure the requisite sequence in the operation of the different parts. The slip-joint is shown as a split hub which can be clamped readily upon a shaft when properly adjusted. Such a slip connection is shown in Fig. 6$^a$ in the clamp-joint $m'$ upon the arm which connects the link $u^{12}$ with the cam U′ which oscillates the carrier-arm U. The cam is not shown in Fig. 4, as the drawing would be confused by the addition of any further lines. Such slip connection is used to vary the time at which the arm U and carrier are oscillated, but the link $u^{12}$ is also adjustable where it is connected to the arm U by means of nuts $u^{30}$. A similar slip connection $m'$ is employed upon the hub of the gear Q′ which transmits the motion to the cam-shaft M′, such hub when slackened permitting the shaft M′ to be turned into the required adjustment, and being then tightened to drive the cam-shaft positively. A similar split hub $m'$ is shown in Fig. 3 upon the arm which actuates the patch-cutter $g$, to vary the position of the patch-cutter, and a similar hub $m'$ is shown upon the arm $e^4$ which connects the tucker $e$ with the cam which oscillates it. I have made claim to such adjusting devices in connection with the various parts of the cigarette machine which operate upon the patch-handling devices, as the exact delivery of these patches to the wrapper is of the utmost importance, to space them upon the wrapper so that they may be properly divided by the cigarette-cutter J.

All of the mechanism described is equally adapted to make and apply a tipping-patch to the wrapper which is suited for only a single cigarette, and in such case twice the number of patches would be applied and in such a position that the cigarette-cutter would sever the rod at one side of the patch instead of the middle.

In Fig. 16, the gear-wheels $m^4$ and $m^2$ are proportioned to feed a patch suited for a double mouth-piece, but a change in the proportion of such wheels may be readily made to feed a shorter patch suited for only a single mouth-piece. It is not essential to the operation of the invention that the sections of tipping material should be supplied to the carriage Q automatically, as only one of such sections is required for every ten or more patches applied to the cigarette-rod, which patches if made of "double length" are capable of supplying mouth-pieces to twenty cigarettes. The magazines $s$ and the means for operating the carrier R in connection therewith are not therefore essential, as it is immaterial whether the sections of tipping material are supplied to the carriage by the carrier R or separately by hand. If supplied by hand, the gum-seats $i$ supplied with paste would be pressed upon each section when laid on the carriage to form the gum-strips $h'$ thereon, and the gum-seats would be stripped automatically therefrom by the strippers $j$, as already described; and the operation of moving the carriage to bring the section of tipping material into the bite of the feed-rolls $a$ would also be the same, by whatever means the carriage is supplied with such sections.

Heretofore, in continuous cigarette machines the tobacco has been formed into a rod by instrumentalities before it reached the paper in which it was subsequently wrapped, but the tobacco is deposited directly upon the wrapper in the present invention, and the rod-forming devices heretofore used are not therefore suitable. With the rod-forming mechanism heretofore used, the shaping of the filler is effected before it reaches the barrel-guide E, and the filler, being very elastic in character, has opposed considerable resistance to compression during the seaming and pasting of the wrapper upon the filler, in the seaming-dies F where such seaming is effected. Such resistance imposes considerable strain upon the tape, and interferes with the uniform progress of the tape and cigarette-rod to the cigarette-cutter J. To prevent such strain upon the tape and to give the filler a more perfect shape in the finished cigarette-rod, I employ only the flat-faced roll $u$ to condense the tobacco in advance of the barrel-guide, and introduce an entirely new feature in such machines by the application of concave-faced rolls $u'$ and $u^2$ to finally shape the tobacco filler, between the barrel-guide E and the seaming-die F. The edges of these shaping-rolls $u'$ and $u^2$ press the tobacco into the shape of the finished cigarette, as shown in Fig. 2$^a$, and thus obviate the resistance in the seaming-die, which is caused by delivering the filler and wrapper to the seaming-die directly from the barrel-guide, in which the tobacco has a free opportunity to expand whatever shaping treatment it may have previously received. The roll $u^2$ is shown with flanges at the side to hold the tape and wrapper in U-shape, while the roll $u'$ is shown with concave edge adapted with the concave groove in the roll $u^2$ to give the filler the elliptical shape that is employed in high class cigarettes. The filler being thus perfectly formed and reduced to its finished size while the wrapper is in U-shape, as shown in Fig. 2ª, before it is folded and pasted, no material resistance arises in the folding and seaming dies, and the tape is able to deliver the cigarette-rod at a more uniform rate of speed and in more perfect shape, to the cigarette-cutter J than if the filler were finally shaped, as heretofore, in the seaming dies. To avoid any resistance to the forward movement of the tape and wrapper, I rotate the roll $u'$ positively by connection with the roll $u$, which is driven by connection with the main shaft B, as shown in Fig. 11. Fig. 11 illustrates merely the connections from the shaft B to various rotating parts, and the roll $u$ is shown in the drawing mounted, as in my previous patents, upon a frog $D^2$, pivoted upon a shaft $D^3$ so as to adjust the upper roll $u$ upon the upper surface of the tobacco $t'$. The upper half of the roll $u'$ is broken off in Fig. 11 so as to clear some parts of the adjacent Fig. 16. The lower roll $u$ supports the tape and is turned thereby. Gears, $t^2$ and chain $t^3$ connect the shaft B with a chain wheel $D^4$ (which is shown only in dotted lines in the drawing) and which operates gears $D^5$ to turn upon the roll $u$. Chain wheels $u^4$ and chain $u^3$ connect the rolls $u$ and $u'$, as shown in Fig. 2, and the roll $u'$ is thus driven positively at the same speed as the wrapper and gives the filler its final shape before the wrapper is folded and pasted over the same. The roll $u^2$ is driven merely by the friction of the tape. Mechanism to give the filler its final shape, just before the wrapper enters the seaming die, is a very material aid in the tipping of the cigarettes, as it removes he of the principal resistances to the regular movement of the tape, which is very essential to the delivery of the cigarette-rod uniformly to the cigarette-cutter so that the cigarettes may be cut in the proper relation to the tipping patches. To further facilitate the steady movement of the paper wrapper and to assist its uniform progress to the printing and tipping devices, I form the roll $r$ of yielding material like india-rubber, paper or leather, and gear it to the roll O, and press it elastically upon the wrapper after it has been tipped. This elastic roll thus presses the recently gummed tipping patches firmly upon the wrapper while it enables the drum O to feed the wrapper uniformly by preventing any slipping of the wrapper upon its surface.

The constructive features claimed herein contribute to the successful operation of the tipping device and overcome the difficulty in applying the tipping patches to the wrapper and the wrapper to the filler.

Having thus set forth the nature of the invention what is claimed herein is:

1. In a continuous cigarette machine, the combination, with means for propelling the wrapper continuously, of means for first printing inscriptions at regular intervals upon the wrapper, means for gumming a tipping section to form a plurality of patches, means for feeding such section intermittingly to the wrapper, and means for severing the patches therefrom and pressing them upon the moving wrapper between the said inscriptions.

2. In a continuous cigarette machine, the combination, with means for propelling the wrapper continuously, and forming a cigarette rod, of means for intermittingly applying gummed tipping-patches upon the flat moving wrapper, a cutter with means for operating it to sever the cigarette rod in the middle of each patch, and gearing connecting the cutter-operating means, and the means for applying the patch to the moving wrapper, whereby both such means are operated in unison.

3. In a continuous cigarette machine, the combination, with means for propelling the wrapper continuously and forming a cigarette rod, of printing mechanism and means for operating the same to print inscriptions at regular intervals upon the wrapper, means for intermittingly applying gummed tipping-patches upon the moving wrapper between the said inscriptions, a cutter with means for operating it to sever the cigarette rod in the middle of each patch, and a "unison-shaft" with positive connections to each of said operating-means, whereby they are driven in unison with one another.

4. In a continuous cigarette machine, the combination, with means for propelling the wrapper continuously and forming a cigarette rod, of means for intermittingly applying gummed tipping-patches upon the flat moving wrapper, a cutter with means for operating it to sever the cigarette rod in the middle of each patch, gearing connecting the wrapper-propelling means and the cutter-operating means, a unison-shaft with gearing including change-wheels connected to the cutter-operating means, and gearing connecting the unison-shaft positively with the means for applying the tipping-patches, whereby the length of the cut cigarettes may be varied and the patches applied in agreement with such variation.

5. In a continuous cigarette machine, the combination, with means for propelling the wrapper continuously and forming a cigarette rod, of printing mechanism and means for operating the same to print inscriptions at regular intervals upon the wrapper, means for intermittingly applying gummed tipping-patches upon the moving wrapper between the said inscriptions, a cutter with means for operating it to sever the cigarette rod in the middle of each patch, gearing connecting the wrapper-propelling means and the cutter-operated means, a unison-shaft with gearing including change-wheels connected to the cutter-operating means, and gearing connecting the unison-shaft respectively to the means for printing and the means for applying the tipping-patches, whereby the length of the cut cigarettes may be varied and the printed inscriptions and patches applied in agreement with such variation.

6. In a cigarette machine, the means for applying tipping-patches to the cigarette wrapper, consisting of means for gumming a tipping-section to form a plurality of patches, means for feeding such section intermittently to the wrapper, and means for severing the patches therefrom and pressing them upon the wrapper at regular intervals.

7. In a continuous cigarette machine, the combination, with means for propelling the wrapper and forming a cigarette rod, of a cutter and means for operating the same to sever the cigarettes, a continuously revolving drum to support the moving wrapper, a roll pressed toward the drum, means for gumming the tipping material and severing patches therefrom, a tucker to push the patches into the bite of the pressing-roll and drum, and gearing connecting the cutter-operating means and the tucker-operating means, whereby the cigarette rods are divided in the middle of each patch.

8. In a cigarette machine, the combination, with means for propelling the wrapper, of a continuously revolving drum to support the wrapper, a roll pressed toward the drum with a patch-guide over its face, feed-rolls adjacent to the patch-guide, a patch-cover between such rolls and patch-guide, a carriage movable longitudinally toward the feed-rolls, means for depositing a gummed section of tipping material upon the carriage with such section overlapping toward the feed-rolls, means for moving the carriage to insert such section in the feed-rolls, means for operating the feed-rolls and patch-cutter intermittingly, whereby the section may be divided into patches, and means for feeding the patches into the bite of the pressing roll and drum.

9. In a cigarette machine, the combination, with means for propelling the wrapper, of a continuously revolving drum to support the wrapper, a roll pressed toward the drum with a patch-guide over its face, feed-rolls adjacent to the patch-guide, a patch-cutter between such rolls and patch-guide, means for feeding a gummed section of tipping materials to the feed-rolls, and a tucker operating over the surface of the patch-guide, the whole arranged and operated to divide the section into patches and to propel the patches intermittingly over the guide into the bite of the drum and pressing-roll.

10. In a device for applying gummed patches to a moving cigarette wrapper, the combination, with a revolving drum supporting the wrapper, and a pressing-roll for pressing the patches successively upon the wrapper, of a carriage movable longitudinally toward the said pressing-roll, a magazine of tipping material sections at the side of the carriage with a paste-roll at the outer side of such magazine, a carrier having longitudinal gum-seats, mechanism for moving the carrier with the gum-seats against the paste-roll, then depressing the gum-seats upon the sections in the magazine, and then depositing a gummed-section upon the carriage with the end of the section overlapping toward the drum, means for feeding the section forwardly from the carriage, and means for severing gummed patches therefrom and delivering them at regular intervals to the bite of the drum and pressing-roll.

11. In a device for applying gummed patches to a moving cigarette wrapper, the combination, with a revolving drum supporting the wrapper, a pressing-roll and means for cutting the sections into patches and feeding them successively to the wrapper, of a carriage movable longitudinally toward the pressing-roll, a magazine of tipping-material-sections at the side of the carriage, each section suited to make a definite number of patches, a carrier movable to and from the magazine and provided with longitudinal gum-seats, means for gumming the said seats, means for pressing the seats upon the sections in the carrier and depositing a section upon the carriage, and gearing connecting the carrier-moving means and the patch-cutting and feeding means, whereby the carrier is operated much less frequently than the feeding means, to supply the sections to the patch-cutter and feeder.

12. In a continuous cigarette machine, the combination, with means for propelling the wrapper and forming the cigarette rod, of a cigarette-cutter and means for operating the same to sever the cigarette rod, a revolving drum supporting the wrapper with a pressing-roll adjacent thereto, a patch-cutter adjacent to the pressing-roll, feed-rolls adjacent to the patch-cutter, means for gumming a section of tipping material and supplying it to the feed-rolls, and gearing connecting the cigarette-cutter with the feed-rolls operating to rotate the feed-rolls intermittingly once for every two strokes of the cigarette-cutter, whereby each patch may be divided in the middle and serve for two cigarettes.

13. In a continuous cigarette machine, the combination, with means for propelling the wrapper and forming the cigarette rod, of a cigarette-cutter and means for operating the same to sever the cigarette-rod, printing mechanism operated to print inscriptions at regular intervals upon the wrapper, a revolving drum supporting the printed wrapper with a pressing-roll adjacent thereto, a patch-cutter adjacent to the pressing-roll, feed-rolls adjacent to the patch-cutter with means for intermittingly rotating the same, means for gumming a section of tipping material and supplying it to the feed-rolls, a unison-shaft with gearing including change-wheels connected to the cigarette-cutter operating means, gearing connecting the unison-shaft positively with the printing mechanism to print an inscription for each stroke of the cigarette-cutter, and means connecting the unison-shaft positively with the feed-rolls for rotating them once for every two strokes of the cigarette-cutter, whereby each patch may be divided in the middle and serve for two cigarettes.

14. In a cigarette machine, the combination, with a drum to support the wrapper and a pressing-roll for pressing gummed patches thereon, of a magazine of tipping-material sections adapted each to form a plurality of patches, a carrier having a plurality of longitudinal gum-seats with means for gumming the said seats, means for pressing the seats upon the top section in the magazine, feed-rolls for receiving said gummed-sections, one of the rolls having grooves to clear the strips of gum upon the section, and means for dividing the gummed-section into patches and supplying them at intervals to the pressing-roll.

15. In a cigarette machine, the combination, with a drum to support the wrapper and a pressing-roll for pressing gummed patches thereon, of a patch-cutter and feed-rolls adjacent to the pressing-roll with a carriage movable longitudinally toward the feed-rolls, a magazine of tipping-material sections adapted each to form a plurality of patches, a carrier having a plurality of longitudinal gum-seats with means for gumming said seats, means for pressing the gummed seats upon the top section in the magazine and lifting said top section and depositing it upon the carriage with one end overlapping the same, whereby the section may be grasped by the feed-rolls when the carriage is advanced, and one of the feed-rolls being grooved to clear the strips of gum upon the section.

16. In a cigarette machine, the means for supplying gummed sections to form tipping patches, consisting of a magazine of tipping-material-sections adapted each to form a plurality of patches, a longitudinally movable carriage at one side of such magazine, a carrier mounted upon a pivoted arm and having the face-plate R with a plurality of longitudinal gum-seats projected therefrom, and a series of longitudinal strippers inserted between the gum-seats with shanks extended through the face-plate, and springs for pressing the strippers normally beyond the gum-seats, means for oscillating the arm to aline the carrier with the magazine and the carriage, a yielding connection between the pivoted arm and the carrier, and means operated automatically to press the carrier outward upon the pivoted arm when in a line with the magazine and with the carriage, whereby a section of tipping material may be lifted from the magazine, deposited upon the carriage and stripped from the gum-seats.

17. In a cigarette machine in which tipping patches are formed from separate sections, the combination, with a rectangular magazine constructed to fit snugly the sides and ends of the sections and having a plunger for pressing the sections upwardly and provided near the top with a series of slots in both of the two opposite sides as set forth, of inclined spring fingers pressed into the slots in contact with the sides of the magazine and sloping toward one another adjacent to the edges of the upper sections, and held from pressure upon the tipping section until the sections are lifted, and operating during the lifting movement of the upper section to contact with the edges of the same and any succeeding sections which are lifted thereby and separate such succeeding sections from the upper section.

18. In a cigarette machine in which the tipping patches are formed from separate sections, the combination, with a rectangular magazine constructed to fit snugly the sides and end of the sections and having a plunger for pressing the sections upwardly and provided near the top with a series of slots in both of two opposite sides as set forth, of inclined spring fingers pressed into the slots in contact with the sides of the magazine and sloping toward one another adjacent to the edges of the upper sections, and serrated upon their inclined opposed faces and held from pressure upon the tipping sections until the sections are lifted, and operating during the lifting movement of the upper section to separate therefrom any succeeding sections.

19. In a cigarette machine in which tipping patches are formed from separate sections, the combination, with a rectangular magazine constructed to fit snugly the sides and ends of the sections and having a plunger for pressing the sections upwardly and provided near the top with a series of slots in both of two opposite sides as set forth, of pivots *t'* outside the base of the magazine, fingers *s'* journaled upon the pivots and having their upper ends extended into the slots and their opposed faces inclined toward one another and serrated as set forth, and springs for pressing the fingers lightly toward the sides of the magazine at the bottoms of the slots, whereby the fingers are held from pressure upon the tipping sections until the upper section is lifted, and operates during the lifting movement of the upper section to separate therefrom any succeeding sections.

20. In a cigarette machine, the combination, with means for forming a cigarette-rod with double mouth-pieces at suitable intervals thereon, and a cutter for dividing the rod into cigarettes at the middle of double mouth-piece, of two stackers and means operated in unison with the cutter for delivering the alternate cigarettes into the two stackers, whereby the cigarettes are arranged in two piles with the mouth-pieces in the opposite ends of the respective piles.

21. In a cigarette machine, the combination, with means for forming the cigarette-rod and cutting the same into cigarettes, of two stackers to receive the cigarettes, two chutes leading to the said stackers, and means for delivering the cut cigarettes alternately to the said chutes.

22. In a cigarette machine, the combination, with means for forming the cigarette-rod and cutting the same into cigarettes, of a trough for receiving the cigarettes when cut, two stackers side by side transverse to the path of the cigarette-rod, two chutes leading to the said stackers with their inlets below the said trough, and means for discharging the cigarettes from the trough alternately into the two chutes.

23. In a cigarette machine, the combination, with means for forming the cigarette-rod and cutting the same into cigarettes, of a trough for receiving the cigarettes when cut and having a movable bottom to discharge the cigarettes therethrough, two stackers to receive the cigarettes, two chutes leading to the said stackers with their inlets below the said trough, and a cam operated in unison with the strokes of the cutter for opening the bottom of the trough under the alternate cigarettes and thus discharging them alternately into the two chutes.

24. In a continuous cigarette machine, the combination, with means for propelling the wrapper continuously and forming a cigarette-rod, of a cigarette-cutter, means for operating it to divide the cigarette-rod, mechanism for gumming and applying tipping-patches to the moving wrapper, means for operating the same, a shaft connecting the means for operating the cigarette-cutter with the means for operating the said tipping-mechanism, and one or more slip joints connecting the said shaft with the tipping-mechanism, whereby the latter may be timed into the required adjustment with the strokes of the cigarette-cutter.

25. In a continuous cigarette machine, the combination, with means for propelling the wrapper continuously and forming a cigarette-rod, of a cigarette-cutter, means for operating it to divide the cigarette-rod, rolls for feeding tipping-patches to the moving wrapper, means for gumming sections of tipping material and delivering them to the said rolls, a cam-shaft with cams for operating the means which gum the sections and deliver them to the feeding-rolls, a shaft connecting the means for operating the cigarette-cutter with the said cam-shaft, and a slip-joint connecting the two shafts, whereby the mechanism for gumming and delivering the sections of tipping-material may be timed into the required adjustment with the strokes of the cigarette-cutter.

26. In a continuous cigarette machine, the combination, with means for propelling the wrapper continuously and forming a cigarette-rod, of a cigarette-cutter, means for operating it to divide the cigarette-rod, rolls for feeding tipping-patches to the moving wrapper, a patch-cutter adjacent to such rolls with means for operating the same, means for gumming sections of tipping-material and delivering them to the said rolls, a cam-shaft with cams for operating the means to gum the sections and deliver them to the feeding-rolls, a shaft connected with the means for operating the cigarette-cutter, and slip-joints connecting the said shaft with the means for operating the patch-cutter and with the said cam-shaft, whereby the sections of tipping-material are supplied to the cutter and the patch-cutter is operated, in proper adjustment with the strokes of the cigarette-cutter.

27. In a continuous cigarette machine, the combination, with means for propelling the wrapper continuously, of means for intermittingly applying gummed tipping-patches upon the flat moving wrapper, means for subsequently depositing a layer of tobacco upon the wrapper, the rolls *u* for condensing the layer of tobacco, the barrel-guide E and seaming and pasting-guide F, with the rolls *u'* and *u²* arranged between the same with their edges formed to give the tobacco-filler its final shape before the wrapper is folded over thereon, and a cutter to divide the cigarette-rod, whereby the friction of the wrapper in the seaming and pasting-guide is diminished, and the wrapper with the tipping-patches thereon is delivered more uniformly to the cigarette-cutter.

28. In a continuous cigarette machine, the combination, with means for propelling the wrapper continuously and forming a cigarette-rod, of the drum O supporting the moving wrapper, with means for gumming patches of tipping material and applying them at intervals to the wrapper, the roll *d* for leading the gummed tipping patches to the wrapper, and the roll *r* having yielding surface pressed elastically toward the drum O upon the wrapper, and geared to the drum to feed the wrapper positively from the tipping appliances to the devices for filling and forming the cigarette-rod.

29. In a continuous cigarette machine, the combination, with means for propelling the wrapper continuously and forming a cigarette-rod, of the drum O supporting the moving wrapper, with means for gumming patches of tipping material and applying them at intervals to the wrapper, the roll *d* for leading the gummed tipping patches to the wrapper and adjusted to hold the wrapper from contact with the drum, and the roll *r* arranged adjacent to the roll *d*, and having yielding surface pressed elastically toward the drum O upon the wrapper to press the tipping patches firmly thereon, and geared to the drum to drive the wrapper positively, substantially as herein set forth.

30. In a continuous cigarette machine, the combination, with means for propelling the wrapper continuously, of a magazine provided with a series of tipping sections adapted each to form a plurality of patches, means for gumming one of the tipping sections, means for feeding such section to the wrapper and means for severing patches successively from such section and pressing them at regular intervals upon the moving wrapper.

31. In a continuous cigarette machine, the combination, with means for propelling the wrapper continuously, of a magazine provided with a series of tipping sections adapted each to form a plurality of patches, means for gumming one of the tipping sections, means for feeding such section intermittingly to the wrapper and means for severing patches successively from such section and pressing them at regular intervals upon the moving wrapper.

In testimony whereof I have hereunto set my hand in the presence of two subscribing witnesses.

FRANK J. LUDINGTON.

Witnesses:
THOMAS S. CRANE,
VICTOR M. SHAW.